United States Patent Office 3,374,052
Patented Mar. 19, 1968

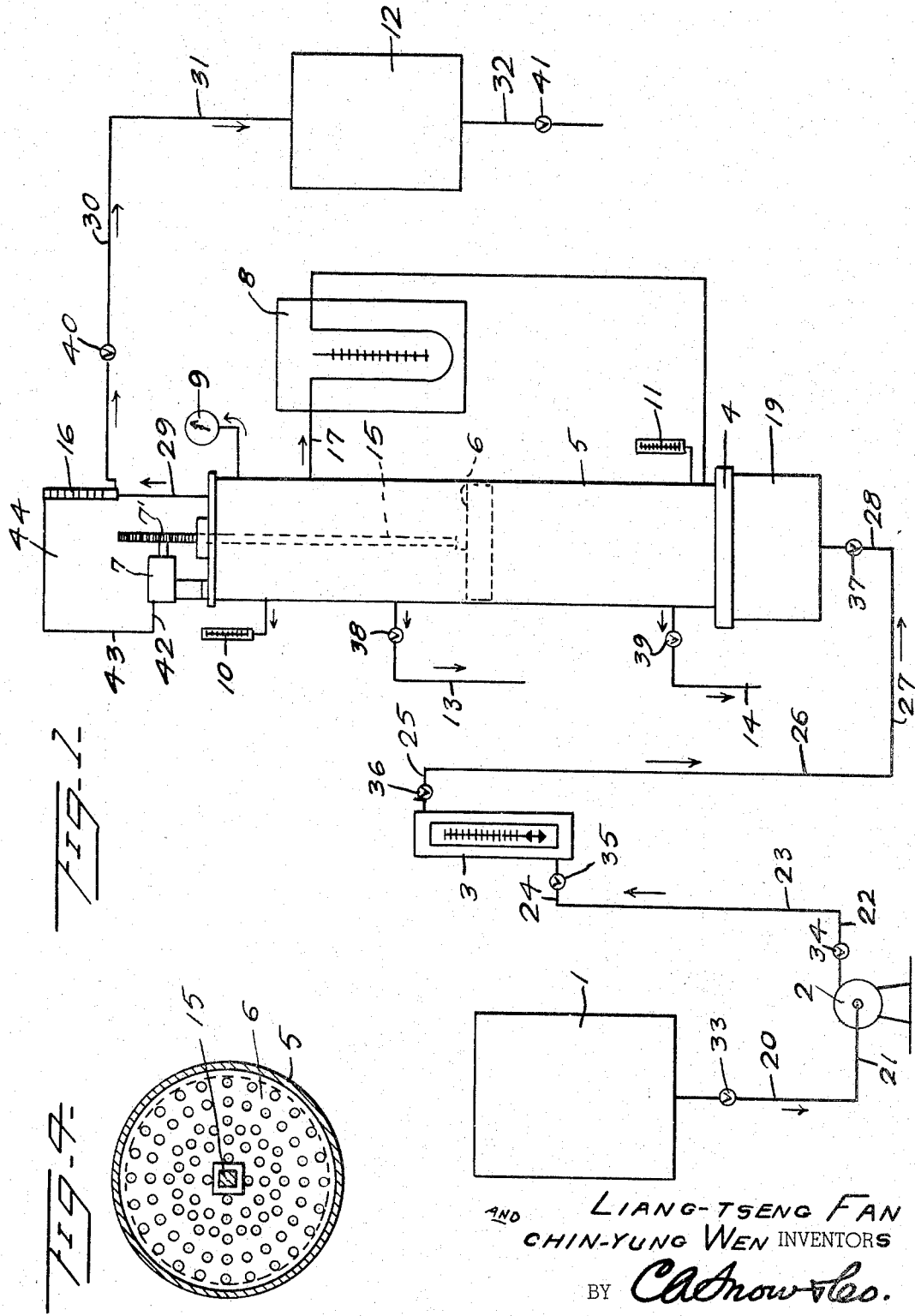

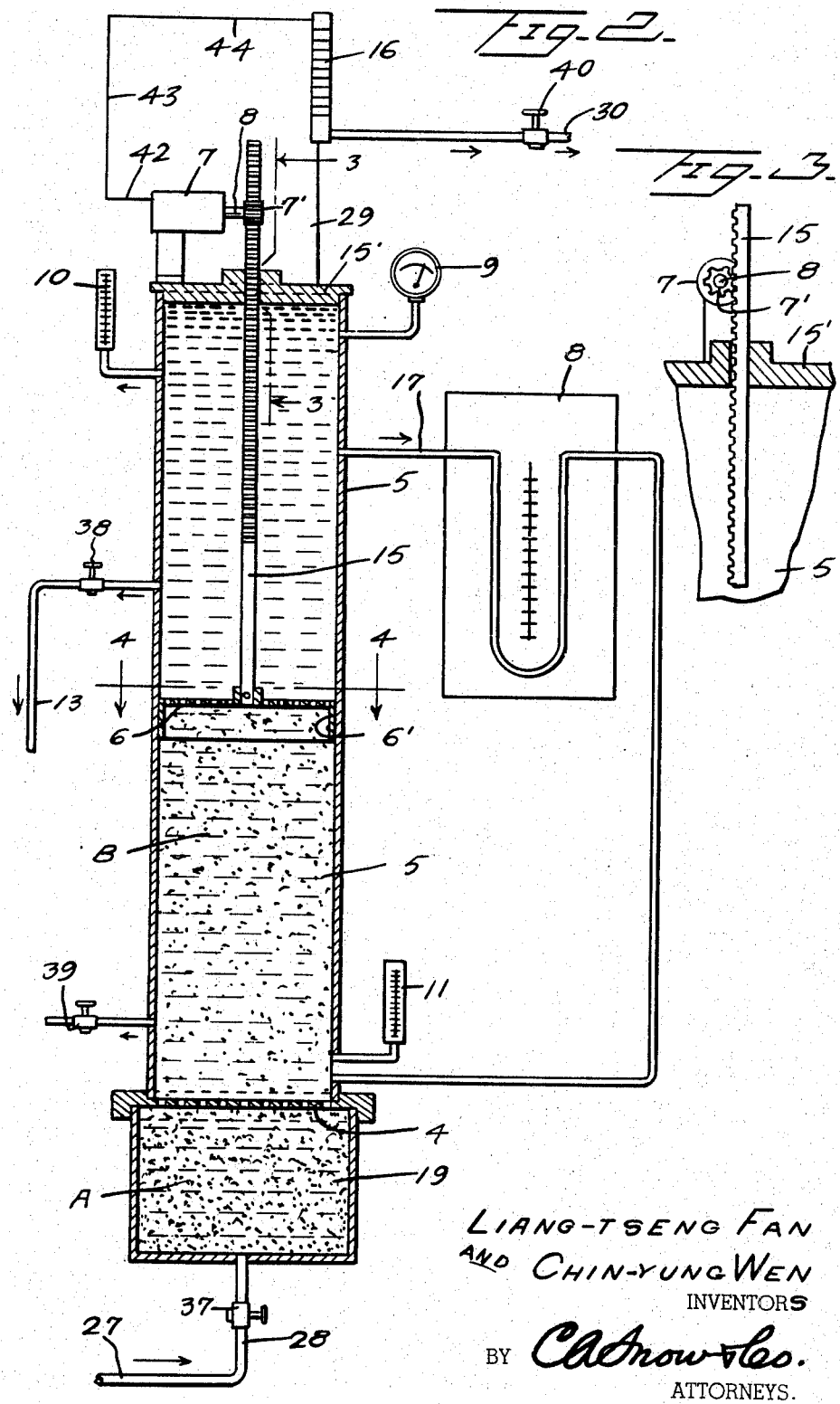

3,374,052
SYSTEM FOR SOLID PARTICLES-FLUID CONTACT OPERATIONS
Liang-Tseng Fan, 2059 College View Road, Manhattan, Kans. 66502, and Chin Yung Wen, c/o Department of Chemical Engineering, West Virginia University, Morgantown, W. Va. 26506
Continuation-in-part of application Ser. No. 292,408, July 2, 1963. This application Dec. 20, 1965, Ser. No. 524,360
15 Claims. (Cl. 23—1)

ABSTRACT OF THE DISCLOSURE

An apparatus and method for producing and utilizing a convertible fluidized bed having an upper phase in which the particles are closely packed in nonfluidized relation and a relatively less dense fluidized phase below the upper phase is disclosed.

---

This invention relates to a method for conducting chemical reactions between solid particles and fluids and other chemical and physical processes requiring the contact between solid particles and fluids, and is a continuation-in-part of our copending application Ser. No. 292,408, filed July 2, 1963, and now abandoned, which is a continuation-in part of application Ser. No. 49,013, filed Aug. 11, 1960, now abandoned.

Known methods for contacting fluids and solid particles commonly involve using a fixed or packed bed of solid particles in which there is little or no relative movement between the solid particles or using a fluidized bed in which the solid particles move about in an upwardly flowing stream of a fluid such as a gas or liquid. The fluidized bed is characterized by a relatively dense lower layer of mobile solid particles having an observable free upper surface which has the appearance of a boiling liquid. By the process of this invention, a dense essentially fixed bed of solid particles is formed in the upper section of a fluid-solid contacting vessel and a relatively less dense layer of mobile fluidized solid particles is simultaneously formed below the dense layer in the upper section of the vessel. By the process of this invention, it is possible to vary the composition of the bed of solid particles from a settled bed to an aerated bed in an expanded quiescent state to a fully fluidized bed to a bed which is partially in a dense essentially fixed state and partially in a fluidized state and to vary the fraction of the bed in these respective latter states. A single dense essentially fixed bed may also be formed by the process of this invention.

The great importance of the solid particles-fluid contact operation and process is obvious from the fact that they are very widely employed for the purposes of achieving catalytic chemical reactions between solid particles and fluids, adsorption and absorption of the matter from fluids by solids, desorption of matter from solids by fluids, transmission of matter and heat by means of solid particles and fluids, drying of fluids and solids, ion exchange, mixing of solids and fluids and other similar processes as mentioned above. Two of the major methods of conducting the solid particles-fluid contact operations are the fixed bed process and the fluidized bed process.

It is well known that when a fluid is caused to flow upwardly through a bed of solid particles, as in known methods, the fluid undergoes a certain magnitude of pressure drop due chiefly to resistance of the solid particles to the flow of the fluid. This pressure drop increases with the increase of flow rate of the fluid. The fluidized bed of solid particles results when the rate of fluid flow reaches such magnitude that the pressure drop of the fluid becomes equal to the weight of the solid particles on the unit cross sectional area of the vessel containing the solid particles, and thus buoys the solid particles and imparts to them a violent, turbulent, fluid-like motion. Another necessary condition for obtaining the fluidization of a bed of solid particles is that there be sufficient free space provided over the bed of solid particles so that the free expansion of the bed which accompanies the increase of the rate of fluid flow is allowed. To maintain the fluidization of solid particles, once obtained, the fluid velocity must be kept between the velocity which will just buoy the solid particled bed termed onset or minimum fluidization velocity, and the velocity which will sweep the bed out of its container known as maximum fluidization velocity. In other words, the fluidized bed is a relatively stable condition of solid particles-fluid contact operation which is intermediate to the fixed bed, on the one hand, and pneumatic transport of the solid particles on the other.

The advantages of fixed bed fluid-solid reactors are well-known to the art. For example, fluid contact with the solid particles is highly efficient, consequently large quantities of solid particles are not required. This is of particular importance where expensive catalysts are the solid particles required. Fixed bed reactors, however, suffer from several serious disadvantages. Tube diameters must be kept relatively small so that sufficient surface area is provided for addition or removal of heat. Where a highly exothermic catalytic process is involved, it is necessary to pass the fluid reactants through a reactor containing many thousands of small tubes containing fixed solid particle beds which are cooled by complex and expensive fused salt or mercury coolant systems in order to prevent excessive radial temperature gradients with resulting catalyst deterioration. Excessive temperature gradients may also result in degradation of the desired product and the production of undesirable side reaction products as well as in reduced chemical yields. Feed concentration of fluid reactants are limited because of difficulties in removing heat from the area where the highly concentrated reactants initially contact the catalyst; as a result, the over-all capacity of such a fixed bed reactor is reduced. In addition, the renewal or repacking of fixed bed fluid-solid particle reactors is an expensive and time consuming operation which may involve considerable shut-down time with consequent loss of production. Depletion of solid reactants or poisoning of catalysts may also occur in localized portions of a fixed bed with a resulting loss in operating efficiency.

The use of fluidized bed reactors avoids many of the problems inherent in fixed bed reactors, for example, bed temperatures are very uniform, recovery of heat of reaction is easily and efficiently achieved, catalyst charging and recharging problems are largely eliminated and, because of better heat transfer properties in a fluidized bed, higher concentrations of reactant fluids may be used. However, because of the vigorous mixing of the reactant and product fluids in the fluidized bed reactor, the effective reaction rate is reduced and bypassing of the solid particles by the reactant fluids in the form of bubbles results. Catalyst particles are also lost by attrition and by elutriation by the fluid stream.

The semifluidized or convertible bed of this invention is a combination, in one reactor, of a dense essentially fixed bed and a fluidized bed. The desirable features of both the fixed bed and the fluidized bed are retained while the disadvantages of both types are eliminated. In particular, it is possible to vary the reactor bed so as to obtain any desired degree of combination of the characteristics of both the fixed and fluidized beds.

The method of this invention for producing or controlling interaction between a fluid and a mass of solid particles forming a convertible semifluidized bed enclosed by a container is accomplished by passing and entering fluid upwardly through a mass of solid particles at a rate intermediate the minimum and maximum fluidizing velocities thereby causing the bed to become fluidized. A mechanical force, which is preferably controllably variable, is exerted uniformly upon the entire free upper surface of the fluidized mass of solid particles in a manner and to a degree operative to cause at least a portion of the mass of particles to form an upper layer which is relatively dense and essentially fixed, in the sense that the individual particles do not significantly move relative to each other. Below this dense fixed layer there is a relatively less dense mobile layer of fluidized solid particles. The mechanical force may be controllably varied to cause the relatively more dense layer to change in thickness with respect to the thickness of the lower relatively less dense fluidized layer in response to a property, such as composition, density or temperature, of the fluid which may be separated from the mass of solid particles after interaction with said particles. The separated fluid may have the same or different composition from that of the entering fluid and, like the entering fluid, may be a liquid or a gas. Similarly the rate of flow or a property, such as temperature or composition, of the entering gas may be controllably varied in response to a measured property of the separated gas. During operation it is possible to control the mechanical force and/or the rate of fluid flow to cause the entire bed to become fluidized thereby mixing the entire mass of solid particles. By the process of this invention, two distinct layers, one relatively fixed above a mobile fluidized layer may be formed without any mechanical separation between the layers.

Many of the solid particles-fluid contact processes previously mentioned can be carried out by either the fixed bed or the fluidized bed. The choice largely depends on the specific requirements of the process, both economical and technical. In other words, the choice between the fixed bed and the fluidized bed is decided by the controlling factors of the process and by whether the advantages of the fluidized or the fixed bed are better utilized in the specific process.

It is the primary object of the present invention to provide a method for simultaneously obtaining two substantially distinct layers of the solid particles within one vessel and for changing the relative magnitude of the depth of the two layers or portions without the use of a mechanical partition between the same. The type of bed used may be termed a "convertible bed," since the method can be readily converted to the use of a relatively densely packed bed or relatively less densely packed or fluidized bed or a combination of the two. This invention also relates to a method for conducting and controlling the solid particles-fluid contact operations such as in catalytic chemical reactions, chemical reactions between solids and fluids, transmission of heat and mass by means of solid particles and fluids, drying of solids and fluids, absorption and adsorption of fluids by solids, desorption of substances from solids by fluids, ion exchange and other similar processes.

In order to better understand the inventive process, reference is made to the drawings; however, it is understood that the apparatus of the drawings is only exemplary since the process can be carried out using other means known to the art.

Referring to the drawings:

FIGURE 1 is a schematic flow diagram showing an apparatus and the flow of materials according to the method of this invention;

FIGURE 2 is a vertical sectional view of the container or vessel in which the solid particles are deposited;

FIGURE 3 is a fragmentary view of a rack bar to which a foraminous sieve plate is secured for exerting variable mechanical pressure in accordance with the instant inventive concept; and FIGURE 4 is a sectional view taken substantially on line 4—4 of FIGURE 2.

Referring now to the drawings in detail, a fluid tank is indicated by the reference character 1, from which any conventional fluid, liquid or gaseous, is moved by means of the pump 2 which is in communication with tank 1 through the conduits 20 and 21, the flow of fluid to the pump 2 being controlled by a valve 33. The pump 2 forces the fluid from tank 1 through the conduits 22, 23 and 24, to the flow measuring device 3 which is a conventional structure and measures the rate of velocity of fluid through the same. Values 34 and 35 control the flow of fluid from the pump 2 to the measuring device, as clearly shown by FIGURE 1 of the drawings.

The reference character 19 indicates a calming or retarding section into which the fluid passes from the flow measuring device 3, through the conduits 26, 27 and 28, the valve 37 controlling the flow thereof to the section 19.

As best seen in FIGURE 2 of the drawings, the calming section 19 is filled with a bed of solid particles A which are held within the section 19 by means of a foraminous plate 4, which may be in the form of filtering cloth, screen, sintered ceramic or other porous material. A tank or column 5 has an open lower end fitted over the foraminous plate 4 and communicates with the section 19, through openings in the plate 4.

Operating within the tank or column 5 is a circular piston, foraminous plate 6, of a type similar to plate 4, which is secured to the lower end of a rack bar 15, the plate 6 having a depending annular flange 6' to provide a fluid tight connection between the periphery of the plate 6 and the interior wall of the tank or column 5.

The rack bar 15 extends through the cover 15' which closes the upper end of the tank or column 5, the cover 15' having an opening disposed axially thereof through which the rack bar 15 operates. This rack bar 15 is in mesh with a pinion 7' mounted on one end of a shaft 8 of a conventional driving mechanism 7, which may be in the form of an electric motor and which may be operatively connected to a measuring device 16 through the wires 42, 43 and 44 for a purpose to be further described hereinafter. The fluid is separated from the solid particles and passes out of the column 5 through the conduits 29, 30 and 31 into a tank 12 on which a discharge conduit 32 is provided, valves 40 and 41 allowing variation of the flow rate. The contents of the tank or column 5 can be discharged through the conduits 13 and 14 having valves 38 and 39, respectively, when necessary.

The composition and other physical properties of the discharged fluid from column 5 through conduit 29 may be determined manually or the automatic measuring device 16 may continuously monitor these conditions, transmitting the information in any conventional manner to the foraminous plate driving mechanism 7 to vary the pressure exerted by the plate 6 in response to changes in the discharged fluid.

The temperature within the tank or column 5 is measured by thermostats 10 and 11 or other temperature measuring devices. A gauge 9 communicates with the upper end of the tank or column 5 to measure the pressure within the same and a differential manometer 8, or similar pressure drop measuring device, is also in communication with the tank or column 5 through a conduit 17.

In operation, when a fluid is moved by pump 2 from the tank 1 through the flow measuring device 3, the fluid passes upwardly through the bed of solid particles B resting on the lower plate 4.

The bed of solid particles B expands with an increase in the fluid flow rate when the rate of fluid force is between the minimum fluidization velocity and the maximum fluidization velocity. When the full expansion of the bed of solid particles B is partially retarded or hindered by means of the upper foraminous plate 6, which allows passage of the fluid only, the bed of solid particles B is substantially segregated or divided into two layers or portions within the tank or column 5 below the upper foraminous plate 6. Directly below the upper foraminous plate 6 there is a relatively dense layer of solid particles similar to a fixed bed. The thickness of the relatively dense layer depends on the expansion qualities of the material of the bed, as well as the flow conditions and the characteristics of the solid particles and fluid. The solid particles not included in the relatively dense layer remain in a relatively less dense or fluidized condition within the bed B and above the lower foraminous plate 4. When the fluid rate equals the maximum fluidization velocity, the entire mass of particles in the bed B is shifted into the relatively densely packed layer immediately below the foraminous plate or top sieve plate 6.

It is apparent from the foregoing that the rate of a physical or chemical process may be changed by varying the relative amounts of the reactor bed which are in the dense essentially fixed condition and fluidized states. Similarly a constant reaction rate may also be obtained, thus compensating for changes in temperature, pressure, quality or quantity of reacting materials, depletion or deterioration of the solid reactant or other operating variables by controlling the dense bed to fluidized bed ratios by varying the expansion of the solid particle bed due to the flow of fluid which is moving at a rate between the minimum and maximum fluidization velocities. The physical or chemical reaction rate may be automatically controlled by automatically measuring the composition or a desired physical or chemical property of the outcoming fluid through conduit 29, in FIGURE 1, and adjusting the expansion of the bed of solid particles by changing the position of the foraminous plate 6.

Likewise, the mechanical pressure exerted by the foraminous plate 6 to cause restriction of the bed expansion may be held constant while the flow rate of the fluid may be varied thereby varying the relative thickness between the relatively dense layer and the relatively less dense fluidized portion. Also, the pressure exerted and the fluid flow rate may be maintained while varying the composition or other physical characteristics or properties such as temperature of the materials to thereby vary the relative thickness of the relatively dense layer and the relatively less dense fluidized portion. Any of these variations may be automatically effected through well known means by monitoring the characteristics of the fluid separated through conduit 29.

Another very obvious application of the system and apparatus used in the method of this invention is to mix the solid particles in the solid particles-fluid contact operations, without using any mechanical agitation and without discharging them outside of the column 5. Intermittent mixing of the solid particles in continuous operations becomes necessary because the solid particles lose their homogeneity during the fixed bed operations. The said mixing can be accomplished by raising the position of the foraminous plate 6, thus inducing fluidization of the solid particles in the bed. The fluid velocity must be increased temporarily during the mixing to maintain the fluidization.

It is possible to replace the entire bed of solid particles by causing the mass of fluidized particles to flow out conduit 14. A fresh lot of particles may be entrained in a fluid and introduced at the same point. Similarly, it is possible to selectively decant any portion of the fluid.

Fluids which may be used in the described process include both gases and liquids. Gases include the fixed gases such as air, oxygen, nitrogen, chlorine and other halogens, methane, ethylene and other hydrocarbons and other organic and inorganic gases. Gases may also include vaporized organic and inorganic solids and liquids, for example, naphthalene and benzene. Liquids which may be used include water, hydrocarbons, alcohols and other organic and inorganic liquids and solutions.

Any solid particulate material may be used. Solid catalysts such as vanadium oxide, nickel and platinized alumina catalysts are commonly used. Ion exchange resins may also be used.

EXAMPLE

An apparatus of the type shown in FIGURE 1 was constructed wherein the column 5 was a glass tube approximately 22 inches long and 2½ inches in diameter. Plates 4 and 6 were in the form of foraminous metal disks having a pore size of less than 14 mesh (0.055 inch). Benzoic acid crystals of 8 to 10 mesh size were loaded into the column, allowing approximately three-fourths of the volume of the vessel for expansion of bed of solid particles. A stream of water was caused to flow upwardly through the bed of benzoic acid particles at a rate intermediate the minimum and maximum fluidizing velocities. The movable foraminous plate 6 and the flow rate of the water were varied to determine the effect of these variables on the fraction of solid particles which accumulated against the upper foraminous plate to form a dense essentially fixed bed of solid particles. Data in Table I show the fraction of the solid particles which are formed into a dense essentially fixed bed as a function of water flow rate and expansion ratio. Expansion ratio is the ratio of space into which the bed can expand to the settled volume of the bed.

TABLE I

| Expansion Ratio | Water Flow Rate, lb./(hr.) (sq. ft.) | Fraction of Particles in Dense Fixed Bed |
| --- | --- | --- |
| 1.37 | .015 | .61 |
| 1.37 | .018 | .81 |
| 1.37 | *.042 | 1.0 |
| 1.58 | .020 | .60 |
| 1.58 | .023 | .70 |
| 1.58 | .028 | .74 |
| 1.58 | .032 | .83 |
| 1.58 | *.042 | 1.0 |
| 2.09 | .021 | .21 |
| 2.09 | .024 | .40 |
| 2.09 | *.042 | 1.0 |
| 2.61 | .028 | .12 |
| 2.61 | .031 | .35 |
| 2.61 | *.042 | 1.0 |

*Approximate flow rate.

The rate of dissolution of benzoic acid in water was found to be an approximately linear function of the expansion ratio of the bed when all other factors were constant. Thus, it was possible to keep the rate of physical and chemical change at a constant rate while the size and effectiveness of the bed and of the particles themselves continuously changed. The utility and value of this process is apparent; for example, this particular process may be used to prepare antiseptic solutions of constant benzoic acid concentration; however, the process of this invention may be used to control physical and/or chemical reaction rates of virtually any known fluid-solid reaction system.

In another example, naphthalene vapor and hot air were introduced into a fluidized zone of vanadium oxide catalyst particle bed situated in the lower part of a semifluidized (convertible) bed. In this zone the excess heat is rapidly removed maintaining a uniform temperature and thus preventing the reactant from being overoxidized. The product gas, phthalic anhydride vapor, accompanied by a small amount of the remaining reactant gas leaving the fluidized zone passed through the dense essentially fixed bed zone formed in the upper part of the semifluidized bed. Almost complete conversion of the remaining naphthalene was achieved in dense fixed zone. In addition, there was no catalyst loss due to elutriation of the fines. Table II compares fixed bed, fluidized bed and semifluidized bed processing of naphthalene to phthalic anhydride.

TABLE II.—COMPARISON OF PHTHALIC ANHYDRIDE PROCESSES

| Type of Reactor | Fixed | Fluidized | Semifluidized (Convertible) |
| --- | --- | --- | --- |
| Air:Naphthalene Ratio by Volume. | 17:1 to 30:1 | 10:1 to 12:1 | 8:1 to 12:1. |
| Space Velocity | Highest (least catalyst) | Lowest (most catalyst) | Medium (moderate catalyst). |
| Catalyst Activity | Highly Active | Moderated Catalyst | Moderated Catalyst. |
| Yield | 83–89% | 85% | 95%. |
| Temperature Control | Temperature differential in tubes as high as 100–300° F. | Temperature within 1–2° F | Temperature within 5–10° F. |
| Byproduct Formation | Tail gases create pollution problems | Minimum byproduct formation, air pollution not a problem. | Minimum byproduct, no air pollution problem. |
| Plant Cost | High | Lower | Lowest. |

Other examples in which semifluidized (convertible) bed processing have been utilized with substantial improvement over either fixed bed or fluidized methods include:

(1) Catalyst oxidation of benzene to produce maleic anhydride.

(2) Catalytic oxidation of toluene.

(3) Catalytic chlorination of ethylene to produce hexachloroethane.

(4) Catalytic hydrogenation of nitrobenzene or nitrotoluene with a large excess of hydrogen to produce the corresponding amines.

(5) Methanation reaction of carbon monoxide and hydrogen on nickel catalyst.

(6) Steam reforming of methane to produce hydrogen and carbon monoxide on nickel catalyst.

(7) Oxidation of sulfur dioxide on vanadium oxide catalyst to produce sulfur trioxide.

(8) Ion exchange processes for purification of glycerine sweet water and for softening of hard water.

In addition to the above applications, many more applications may obviously be found; for example, fluids such as air, nitrogen, the noble gases, hydrocarbons, natural gas, high purity methane, carbon dioxide, liquids such as gasoline and other fuels, and many industrial and fuel gases may be dryed by passing them through convertible semifluidized beds of desiccants such as silica gel, calcium chloride, molecular sieves, etc., heat may be added to an endothermic chemical reaction or extracted from an exothermic reaction using the described method and employing such fluids as mixed or pure gases, molten metals or fused salts; particles may be treated in a semifluidized bed to obtain desired properties, for example, adsorbents such as charcoal may be activated. The list of potential useful applications to which the inventive process may be applied would obviously encompass many more well-known chemical and physical fluid-solid contact processes. Such processes are often preferably carried out using automatic sensing and control systems of the type described by Ahrendt, "Automatic Feedback Control," McGraw-Hill Book Co., New York, first edition, 1951, and marketed by The Foxboro Company, Fischer-Portor Company, Beckman Instrument Company, Leeds and Northrup Company, and many other instrument manufacturers. Such control devices are commonly used by those skilled in the art for sensing such variables as temperature, moisture content, chemical concentration or composition, etc., and controlling such variables as time, temperature, composition, flow rates, pressure, force and many other operating factors. Specific examples of such control ssytems are given in Bulletins 225–1 and 188–4 published by The Foxboro Company, Foxboro, Mass.

While automatic control is commonly used in carrying out the inventive process, it is not a necessary part thereof.

It will now be seen that there is herein disclosed an improved process for producing interaction between a fluid and a mass of solid particles which provides many advantages of great practical utility and commercial importance.

Since many embodiments may be made of the instant inventive concept and since many modifications may be made of the embodiments hereinbefore shown and described, it is to be understood that all matter herein is to be interpreted as illustrative and not in a limiting sense.

We claim:

1. The method of interacting a fluid with solid fluidizable particles which comprises the steps of:

confining a mass of the particles in a vessel between upper and lower foraminous bodies;

flowing the fluid upwardly through the particles at a rate such that the pressure drop of the fluid flowing through the bed is at least equal to the weight of the solid particles on the unit cross-sectional area of the bed to thereby form a fluidized phase of such particles;

maintaining the rate of fluid flow through the particles at a rate between that required for the onset of fluidization which will just buoy the solid particles in the fluidified phase and a rate equal to the maximum fluidization velocity which will sweep the mass of particles upwardly from the lower formaminous body;

positioning the upper foraminous body to exert a mechanical force in opposition to the fluid force; and adjusting the fluid flow rate and the mechanical force in correspondence such that the fluid force and the mechanical force interact in opposition to fix a multiplicity of the particles against the upper foraminous body to form a uniform packed phase of relatively immobile particles supported uniformly above the fluidized phase against the mechanical force by the fluid exiting from the residual lower fluidized phase of particles.

2. A method in accordance with claim 1 comprising the additional step of controllably varying said mechanical force to cause the relative thickness of said dense essentially fixed upper layer to change with respect to the thickness of the lower less dense fluidized layer of solid particles.

3. A method in accordance with claim 2 in which the fluid is separated from said mass of solid particles after interaction of said fluid entering said mass with said particles.

4. A method in accordance with claim 3 in which the mechanical force is controllably varied in response to a property of the fluid which is separated from said mass of solid particles.

5. A method in accordance with claim 3 wherein the rate of flow of said fluid entering said convertible bed of solid particles is varied in response to a property of the fluid which is separated from said mass of solid particles.

6. A method in accordance with claim 3 wherein a property of said entering fluid is varied in response to a property of the fluid which is separated from said mass of solid particles.

7. A method in accordance with claim 1 comprising mixing said mass of solid particles during interaction with said fluid by controllably varying said mechanical force operative to permit fluidization of the entire mass of said particles for an interval of time.

8. The method of claim 1 wherein the fluid comprises a gas.

9. The method of claim 8 wherein the fluid comprises hydrocarbon vapors.

10. The method of claim 8 wherein the fluid comprises a mixture of gases at least some of which are reactive with each other.

11. The method of claim 1 wherein the fluid comprises a liquid.

12. In a method for producing interaction between a fluid and a mass of solid particles, which includes the steps of:
(a) providing a bed of fluidizable solid particles and
(b) flowing a fluid material through the bed upwardly at a rate such that the pressure drop of the fluid flowing through the bed is at least equal to the weight of the solid particles on a unit cross-sectional area of the bed to produce a fluidized mass of said particles, the improvement which comprises the steps of:
(c) increasing the rate of fluid flow through the bed to a rate above that necessary to produce minimum fluidization of the bed of said particles by said fluid;
(d) collecting the particles carried from the fluidized mass into a substantially immobile mass of relatively fixed particles; and
(e) exerting a controllable variable force uniformly upon substantially the entire upper surface of the bed of particles for positioning the collected particles in a substantially nonfluent mass adjacent the surface of the fluidized mass, said controllably variable force being so exerted in opposition to fluid force on the particles to pass fluid from the vessel while fixing a multiplicity of particles into a relatively fixed uniform packed phase of relatively immobile particles supported above the fluidized phase against the variable force by the fluid exiting from the residual lower fluidized phase of particles, said nonfluidized mass being of greater volume density than the volume density of the fluidized mass, to thereby cause the fluid to interact first with the fluidized mass and then with the nonfluidized mass in the bed.

13. The method of claim 12 further comprising the step of:
controllably varying the rate of fluid flow through said mass for changing the ratio of the portion of the particles in the fixed bed relative to the portion of the particles in the fluidized bed.

14. The method of claim 12 further comprising the step of:
changing the ratio of the portion of the particles in the fixed bed relative to the portion of particles in the fluidized bed by controllably varying the position of the opposing uniform force.

15. An apparatus for treating a fluid in which said fluid is contacted with a bed of solid particles comprising:
(1) a vessel having a passageway of substantially constant cross sectional area and configuration;
(2) a foraminous member closing the lower end of said vessel;
(3) means for controllably forcing a fluid through said foraminous member upwardly through said vessel;
(4) a movable foraminous piston disposed above said foraminous member closely received in said vessel;
(5) a mass of fluidizable particles intermediate the foraminous closing member and the foraminous piston, said mass including a fixed upper bed and a fluidized relatively less dense lower bed;
(6) means for controllably varying the position of the piston within the vessel, said piston control means being operable to move said piston independently of the level of particles in said vessel above a minimum level for exerting a substantially uniform force on the top of said fixed bed and;
(7) means for sensing a property of the fluid exiting from the bed, and means responsive to said sensing means for controlling a parameter of the input fluid.

References Cited
UNITED STATES PATENTS

| | | | |
|---|---|---|---|
| 2,053,518 | 9/1936 | Crittenden | 23—283 |
| 2,353,505 | 7/1944 | Scheineman | 23—288.3 |
| 2,687,343 | 8/1954 | Crask et al. | 23—288.35 |

JAMES H. TAYMAN, JR., *Primary Examiner.*

M. O. WOLK, *Examiner.*